(12) United States Patent
Miahczylowicz-Wolski et al.

(10) Patent No.: US 8,773,652 B2
(45) Date of Patent: Jul. 8, 2014

(54) METHOD AND DEVICE FOR ALIGNING A LENS WITH AN OPTICAL SYSTEM

(75) Inventors: Cyril Miahczylowicz-Wolski, Suzhou Industrial Park (CN); Jean-Pierre Lusinchi, Suzhou Industrial Park (CN)

(73) Assignee: Ether Precision, Inc., Grand Cayman (KY)

( * ) Notice: Subject to any disclaimer, the term of this patent is extended or adjusted under 35 U.S.C. 154(b) by 252 days.

(21) Appl. No.: 13/384,143

(22) PCT Filed: Aug. 11, 2009

(86) PCT No.: PCT/IB2009/007151
§ 371 (c)(1),
(2), (4) Date: Jan. 13, 2012

(87) PCT Pub. No.: WO2011/018678
PCT Pub. Date: Feb. 17, 2011

(65) Prior Publication Data
US 2012/0113413 A1      May 10, 2012

(51) Int. Cl.
*G01M 11/00* (2006.01)
*G01B 11/00* (2006.01)

(52) U.S. Cl.
USPC ........................................ 356/124.5; 356/399

(58) Field of Classification Search
None
See application file for complete search history.

(56) References Cited

U.S. PATENT DOCUMENTS

| | | | | |
|---|---|---|---|---|
| 4,582,427 A | * | 4/1986 | Hutchin | 356/124.5 |
| 4,641,963 A | * | 2/1987 | Levine | 356/124.5 |
| 4,760,447 A | * | 7/1988 | Koka et al. | 348/184 |
| 5,303,023 A | * | 4/1994 | Portney et al. | 356/124.5 |
| 5,818,572 A | * | 10/1998 | Pappas et al. | 356/124.5 |
| 6,493,075 B1 | * | 12/2002 | Huang et al. | 356/124.5 |
| 8,400,505 B2 | * | 3/2013 | Oyama et al. | 348/135 |
| 2004/0252195 A1 | | 12/2004 | Lu et al. | |
| 2007/0133969 A1 | * | 6/2007 | Ish-Shalom et al. | 396/89 |
| 2009/0279075 A1 | * | 11/2009 | Tsai | 356/124 |

FOREIGN PATENT DOCUMENTS

JP      2002-098875      4/2002

OTHER PUBLICATIONS

Chir-Weei Chang: "An analytical method for measuring the decetraction of a lens module", SPIE, PO Box 10 Bellingham, WA 98227-0010, USA, vol. 6671, pp. 667116-1-667116-8; Sep. 14, 2007, XP040244178 DOI: 1117/12.730598.

(Continued)

*Primary Examiner* — Gordon J Stock, Jr.
(74) *Attorney, Agent, or Firm* — Ladas & Parry, LLP

(57) ABSTRACT

The invention comprises a process for pre-aligning a lens with an optical system, the process comprising: providing a lens and an optical system having an optical axis, wherein the lens is apt to be aligned with the optical system to form on an image plane an image of a source object, the image having top, bottom, left and right edges; coarsely positioning the lens with respect to the optical system; and in a plane normal to the optical axis of the optical system, correcting the position of the lens until the values of four Combination Modulation Transfer Functions (C-MTF) are in predetermined ranges, the C-MTF being calculated at four coarse measurement locations situated close to the edges of the image along two coarse positioning axes crossing the center of the image, each for a combination pattern comprising a combination of a Sagittal pattern and a Tangential pattern.

13 Claims, 11 Drawing Sheets

(56) References Cited

OTHER PUBLICATIONS

Aki Tervonen, Ilkka Nivala, Pasi Ryyty, Hannu Saari, Harri Ojanen and Jarkko Viinikanoja: "integrated measurement system for miniature camera modules", SPIE, PO Box 10 Bellingham WA, 98227-0010, USA, vol. 6169, pp. 61960L-1-61960L-9, Apr. 21, 2006, XP040223729 DOI: 10.1117/12.662650, p. 1, paragraphs 2, 4.2; figure 12.

Darveaux, R., et al: "Packaging image sensor devices for camera module applications" Thermal and Thermomechanical Phenomena in Electronic Systems, 2004. IT HERM '04. The Ninth Intersociety Conference on Las Vegas, NV, USA June 104, 2004, Piscataway, NJ, USA, IEEE LNKD-DOI: 10.1109/ITHERM.2004.1319149, Jan. 1, 2004, pp. 18-27, XP010714844, ISBN: 978-0-7803-8357-9, p. 24; figure 7,8.

ISR for related PCT/IB2009/007151 mailed on May 18, 2010.

IPRP for related PCT/IB2009/007151 issued on Feb. 14, 2012.

\* cited by examiner

METHOD AND DEVICE FOR ALIGNING A LENS WITH AN OPTICAL SYSTEM

CROSS-REFERENCE TO RELATED APPLICATIONS

This application is the U.S. National Stage of International Patent Application No. PCT/IB2009/007151 filed on Aug. 11, 2009, the disclosures of which is hereby incorporated by reference in its entirety.

BACKGROUND OF THE INVENTION

The invention relates to the manufacturing of multi lenses optical modules, such as, but not limited to, the optical modules used in the camera for mobile phones.

The invention relates in particular to a method and device for aligning a lens with an optical system, the optical system comprising for example one lens or more. The invention relates more particularly to a method and device for implementing a fast coarse pre-alignment of the lens with the optical system. The coarse pre-alignment allows to subsequently rapidly conduct a precise alignment of the lens with the optical system.

As a preamble, it is to be noted that the definition of the terms "focal distance", "hyperfocal distance", "convergence", "optical axis", "sagittal", "tangential", "MTF or Modulation Transfer Function", "optical axis", "spatial frequency", "optical center" can be found in:

Warren J. Smith. Modern Optical Engineering. McGraw-Hill.

FIG. 1 shows an elevation view of the main elements composing an optical module 10 that can be used in a camera of a mobile phone. A support 12 comprises a cylindrical recess 14 having an axis 16 and a base 18. Base 18 comprises an aperture around axis 16. A number of lens assemblies 20a, 22a; 20b, 22b; 20c, 22c; 20d, 22d (four are illustrated) comprising each a spacer ring (20a, 20b, 20c, 20d) followed by a lens (22a, 22b, 22c, 22d) are maintained within the recess 14 with a cylindrical barrel 24 that comprises an aperture around axis 16. A sensor 26 is eventually provided such that it receives light crossing the lenses along axis 16. Sensor 26 can form part of the module or can be provided separately.

The quality of an optical module such as module 10 depends strongly on the alignment of the optical axis of the different lenses (22a, 22b, 22c, 22d) composing the module.

In the case of the modules used in mobile phones, the focal length of the module, which is the distance from the optical center of the lens assembly to the sensor onto which is formed the image, is constraint by the small dimension of the phone, and must generally range from 1 mm to 6 mm. Such a short focal distance is obtained by using a lens assembly combining several lenses having a high convergence, ranging approximately from 100 to 1000.

The higher the convergence of a given lens, the more important is the alignment of the optical axis of this lens with the optical axis of the rest of the module. It follows that for modules to be used in high resolution camera such as comprising above 5 megapixels with a focal length in the range of 3 to 5 mm, the alignment of the lenses has to be done with an accuracy of one micron, or less.

High quality modules composed of more than 3 lenses currently require at least one alignment made with an accuracy of 1 to 5 microns. Making such alignments is very time consuming.

A need exists for a method and device that allow aligning rapidly and with great precision a lens with an optical system.

SUMMARY OF THE INVENTION

An embodiment of the invention comprises pre-aligning a lens with an optical system by: starting with the lens roughly aligned on the optical system, following the steps of: a/calculate coarse MTF for the combined lens & optical system on at least four coarse measurement locations, b/move toward location of lowest coarse MTF by a predetermined distance, c/goto a/ unless the predetermined condition are reached).

Another embodiment of the invention comprises pre-aligning a lens with an optical system by: starting with the lens roughly aligned on the optical system; and correcting the position of the lens until the values of Modulation Transfer Functions calculated for a pattern comprising a combination of a Sagittal pattern and a Tangential pattern at four coarse measurement locations are in predetermined ranges.

Another embodiment of the invention comprises a process for pre-aligning a lens with an optical system, the process comprising:

providing a lens and an optical system having an optical axis, wherein the lens is apt to be aligned with the optical system to form on an image plane an image of a source object, the image having top, bottom, left and right edges;

coarsely positioning the lens with respect to the optical system; and in a plane normal to the optical axis of the optical system, correcting the position of the lens until the values of four Combination Modulation Transfer Functions (C-MTF) are in predetermined ranges, the C-MTF being calculated at four coarse measurement locations situated close to the edges of the image along two coarse positioning axes crossing the center of the image, each for a combination pattern comprising a combination of a Sagittal pattern and a Tangential pattern.

According to an embodiment of the invention, correcting the position of the lens until the values of the four C-MTFs are in predetermined ranges comprises repeating the steps:

calculating the C-MTFs; and in a plane normal to the optical axis of the optical system, along a line parallel to the coarse positioning axis of the image comprising the coarse measurement location having the C-MTF with the lowest value, moving the lens by a predetermined step toward said coarse measurement location;

until any of the C-MTF is above a predetermined C-MTF threshold and the difference between the largest C-MTF and the smallest C-MTF is below a predetermined C-MTF difference threshold, or until the lens is moved a predetermined number of times.

According to an embodiment of the invention, the method above further comprises:

providing a source object having, in four coarse measurement locations, a combination of a Sagittal pattern and a Tangential pattern.

According to an embodiment of the invention, the method above further comprises:

providing a source object having, in its four coarse measurement locations, a checkerboard pattern having rows and columns respectively parallel and perpendicular to the top-to-bottom axis of the object.

According to an embodiment of the invention, the two axes of the image comprising the coarse measurement locations follow the diagonals of the image, and the four coarse measurement locations are situated at the four corners of the image.

According to an embodiment of the invention, coarsely positioning the lens comprises aligning the center of the source object with the optical axis of the optical system; and positioning the lens with respect to the optical system such that the image of the center of the source object formed on the image plane coincides with the intersection of the image plane and the optical axis of the optical system.

Another embodiment of the present invention comprises a process for aligning a lens with an optical system, said process including:

pre-aligning the lens with the optical system according to the methods above;

adjusting the position of the lens, in the plane normal to the optical axis of the optical system along a line parallel to a first precise positioning axis that crosses the center of the image and passes through first and second precise measurement locations situated close to opposite edges of the image, until first and second Sagittal and Tangential Modulation Transfer Functions of the combined lens and optical system, calculated at the first and second precise measurement locations, are such that difference between the Sagittal Modulation Transfer Functions of the first and second precise measurement locations and difference between the Tangential Modulation Transfer Functions of the first and second precise measurement locations are minimal, each of the Modulation Transfer Functions being above a first predetermined threshold; and adjusting the position of the lens, in the plane normal to the optical axis of the optical system along a line parallel to a second precise positioning axis that crosses the center of the image and passes through third and fourth precise measurement locations situated close to opposite edges of the image, until third and fourth Sagittal and Tangential Modulation Transfer Functions of the combined lens and optical system, calculated at the third and fourth precise measurement locations, are such that difference between the Sagittal Modulation Transfer Functions of the third and fourth precise measurement locations and difference between the Tangential Modulation Transfer Functions of the third and fourth precise measurement locations are minimal, each of the Modulation Transfer Functions being above a second predetermined threshold.

According to an embodiment of the invention, in the method above:

the first and second precise measurement locations are situated at the middle of the top and bottom of the image, the first precise positioning axis being the vertical axis of the image and the first and second Sagittal and Tangential Modulation Transfer Functions being Top and Bottom Sagittal and Tangential Modulation Transfer Functions; and the third and fourth precise measurement locations are situated at the middle of the left and right of the image, the second precise positioning axis being the horizontal axis of the image and the third and fourth Sagittal and Tangential Modulation Transfer Functions being Left and Right Sagittal and Tangential Modulation Transfer Functions.

According to an embodiment of the invention, in the method above, adjusting the position of the lens along a line parallel to the vertical axis of the image comprises:

adjusting the position of the lens along said line until:

any of a Top Sagittal Modulation Transfer Function (TS-MTF) and a Top Tangential Modulation Transfer Function (TT-MTF) of the combined lens and optical system, calculated at the middle of the top of the image, and any of a Bottom Sagittal Modulation Transfer Function (BS-MTF) and a Bottom Tangential Modulation Transfer Function (BT-MTF) of the combined lens and optical system, calculated at the middle of the bottom of the image, are above the first predetermined threshold; and a value $GmV=\alpha1((TS\text{-}MTF)-(BS\text{-}MTF))^{n1}+\beta1((TT\text{-}MTF)-(BT\text{-}MTF))^{n2}$, reaches a minimum below a third predetermined threshold, where $\alpha1$, $\beta1$, $n1$, $n2$ are predetermined weighting factors; and said adjusting the position of the lens along a line parallel to the horizontal axis of the image comprises:

adjusting the position of the lens along said line until:

any of a Left Sagittal Modulation Transfer Function (LS-MTF) and a Left Tangential Modulation Transfer Function (LT-MTF) of the combined lens and optical system, calculated at the middle of the left of the image, and any of a Right Sagittal Modulation Transfer Function (RS-MTF) and a Right Tangential Modulation Transfer Function (RT-MTF) of the combined lens and optical system, calculated at the middle of the right of the image, are above the second predetermined threshold; and a value $GmH=\alpha2 ((TS\text{-}MTF)-(BS\text{-}MTF))^{n3}+\beta2((TT\text{-}MTF)-(BT\text{-}MTF))^{n4}$ reaches a minimum below a fourth predetermined threshold, where $\alpha2$, $\beta2$, $n3$, $n4$ are predetermined weighting factors.

According to an embodiment of the invention, in the method above:

GmV reaches a minimum when the variation of GmV changes from negative to positive; and GmH reaches a minimum when the variation of GmH changes from negative to positive.

According to an embodiment of the invention, in the method above said adjusting the position of the lens along a line parallel to the vertical axis of the image comprises:

repeating the steps of:

calculating the Top and Bottom, Sagittal and Tangential Modulation Transfer Function values and the GmV value; and moving the lens by a predetermined step in a first direction along a vertical line;

until the calculated values have the desired levels with respect to the first and third predetermined thresholds and GmV reaches a minimum or until the lens reaches a predetermined outward position; and if the lens reaches said predetermined outward position in said first direction, moving back the lens to its original position on said vertical line and repeating the steps of:

calculating the Top and Bottom, Sagittal and Tangential Modulation Transfer Function values and the GmV value; and moving the lens by a predetermined step in a direction opposite the first direction along said vertical line;

until the calculated values have the desired levels with respect to the first and third predetermined thresholds and GmV reaches a minimum or until the lens reaches a predetermined outward position in said opposite direction, in which case the lens is discarded.

According to an embodiment of the invention, in the method above said adjusting the position of the lens along a line parallel to the horizontal axis of the image comprises:

repeating the steps of:

calculating the Left and Right, Sagittal and Tangential Modulation Transfer Function values and the GmH value; and moving the lens by a predetermined step in a first direction along a horizontal line;

until the calculated values have the desired levels with respect to the second and fourth predetermined thresholds and GmH reaches a minimum or until the lens reaches a predetermined outward position; and if the lens reaches said predetermined outward position in said first direction,
moving back the lens to its original position on said horizontal line and
repeating the steps of:
calculating the Left and Right, Sagittal and Tangential Modulation Transfer Function values and the GmH value; and
moving the lens by a predetermined step in a direction opposite the first direction along said horizontal line;
until the calculated values have the desired levels with respect to the second and fourth predetermined thresholds and GmH reaches a minimum or until the lens reaches a predetermined outward position in said opposite direction, in which case the lens is discarded.

An embodiment of the invention further comprises providing an image sensor capable of sensing the image of the source object on the image plane.

The present invention also comprises an apparatus provided for implementing any of the methods above.

The present invention also comprises a source object to be used in an process for pre-aligning a lens with an optical system, the source object having, in each of four coarse measurement locations situated close to the edges of the object along two axes crossing the center of the object, a pattern comprising a combination of a Sagittal pattern and a Tangential pattern.

According to an embodiment of the invention, the source object further comprises, in each of four precise measurement locations situated close to the edges of the object along first and second precise positioning axes crossing the center of the object, a pattern comprising a juxtaposition of a Sagittal pattern and a Tangential pattern.

According to an embodiment of the invention, the source object has a top, a bottom, a left and a right; wherein:
the middle of the top of the object comprises a juxtaposition of a Sagittal pattern and a Tangential pattern;
the middle of the bottom of the object comprises a juxtaposition of a Sagittal pattern and a Tangential pattern;
the middle of the left of the object comprises a juxtaposition of a Sagittal pattern and a Tangential pattern;
the middle of the right of the object comprises a juxtaposition of a Sagittal pattern and a Tangential pattern; and
wherein
the top-left, top-right, bottom left and bottom right corners of the object comprise each a combination of a Sagittal pattern and a Tangential pattern.

According to an embodiment of the invention, the juxtaposition of a Sagittal pattern and a Tangential pattern comprises a set of lines parallel to the first precise positioning axis of the object juxtaposed with a set of lines parallel to the second precise positioning axis of the object, each set of lines being on one side of the corresponding precise positioning axis of the object.

According to an embodiment of the invention, the combination of a Sagittal pattern and a Tangential pattern comprises a checkerboard pattern having rows and columns respectively parallel and perpendicular to a top-to-bottom axis of the object.

According to an embodiment of the invention, the juxtaposition of a Sagittal pattern and a Tangential pattern comprises a set of lines slanted by a few degrees with respect to the parallel to the first precise positioning axis of the object juxtaposed with a set of lines slanted by a few degrees with respect to the parallel to the second precise positioning axis of the object, each set of lines being on one side of the corresponding precise positioning axis of the object.

According to an embodiment of the invention, the combination of a Sagittal pattern and a Tangential pattern comprises a checkerboard pattern having rows and columns respectively slanted by a few degrees with respect to the parallel and perpendicular to a top-to-bottom axis of the object An embodiment of the invention comprises a process for pre-aligning a lens with an optical system, the process comprising: providing a lens and an optical system having an optical axis, wherein the lens is apt to be aligned with the optical system to form on an image plane an image of a source object, the image having top, bottom, left and right edges; coarsely positioning the lens with respect to the optical system; and repeating the steps comprising:
calculating four Combination Modulation Transfer Function (C-MTF) of the combined lens and optical system, at four coarse measurement locations situated close to the edges of the image along two coarse positioning axes crossing the center of the image;
in a plane normal to the optical axis of the optical system, along a line parallel to the coarse positioning axis of the image comprising the coarse measurement location having the C-MTF with the lowest value, moving the lens by a predetermined step toward said coarse measurement location;
until any of the C-MTF is above a predetermined C-MTF threshold and the difference between the largest C-MTF and the smallest C-MTF is below a predetermined C-MTF difference threshold, or until the lens is moved a predetermined number of times.

According to an embodiment of the invention, said calculating the four Combined Modulation Transfer Function (C-MTF) of the combined lens and optical system comprises, at each of the coarse measurement location of the image, calculating a Modulation Transfer Function for a pattern comprising a combination of a Sagittal pattern and a Tangential pattern.

DETAILED DESCRIPTION OF THE INVENTION

Because it is not economical to correct individually the centering of each lens of a module having more than two lenses, the present invention relates in particular to modules designed such that the lens on top of the lens stack concentrates most of the convergence of the module, and the remaining lenses have a low convergence, and are just intended to correct aberrations without modifying significantly the convergence.

With such modules, only one precise alignment is required, for the top lens having the highest convergence.

In what follows, the lens on top of the stack is referred to as the top lens, and the others lenses are referred to as the fixed stack.

The present invention relates to the method to perform a precise and fast alignment of the top lens with respect to the optical axis of the fixed stack. The optical axis of the stack is practically defined as the optical axis of one of the lenses in the stack, for example the bottom lens.

The alignment of the top lens with the optical system forming the fixed stack is optimal when the optical quality of the module (lens+optical system) is maximal. The optical quality can be characterized by the MTF (Modulation Transfer Function. See (1)) measured in the two preferential directions: Sagittal (equivalent to Vertical for a human observer standing upright) and Tangential (Horizontal for the same observer).

Figure 2:
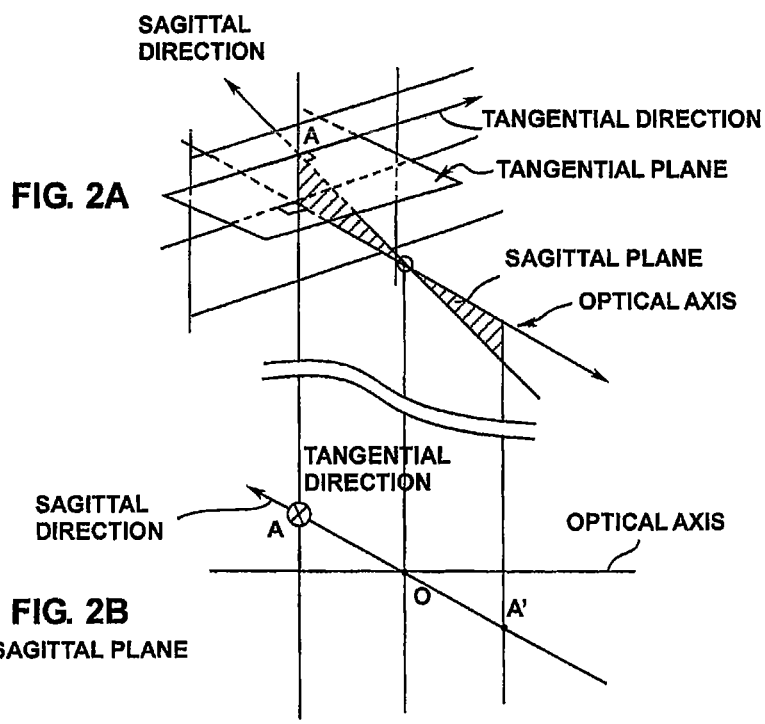
FIGS. 2a and 2b illustrate the Sagittal and Tangential directions with respect to an optical system.

The terms Sagittal and Tangential can briefly be defined as follows, in relation with FIGS. 2a, 2b:

In an optical system having an optical center O, a punctual object A has an image which is also punctual. The object, the image and the optical axis are in the same plane, which is the Sagittal plane. A linear object which intersects the axis, being all contained in the Sagittal plane has an image which is also in the Sagittal plane. The Sagittal direction is defined in the image plane (perpendicular to the optical axis) by the line crossing the point A and the optical center O.

The Tangential plane is the plane which contains the object A and is perpendicular to the Sagittal plane. The Tangential direction is defined in the image plane by the line perpendicular to the Sagittal direction and passing by A.

The MTF can then briefly be described as follows, assuming that the optical system allows forming an image of an object.

The MTF, or Modulation Transfer Function, is the modulus of the complex OTF, or Optical Transfer Function, which is the Fourier transform in the spatial frequency domain of the function which defines the illumination of the image of a punctual object in the spatial dimension domain.

An object in the space domain can be decomposed into small elements, each of them being the sum of its spatial frequency components, and the illumination of the image is the sum of the image of all spatial components, multiplied by the modulus of the OTF.

One can measure directly the MTF for a given frequency by measuring the illumination of the image of an object which has only this single spatial frequency.

Such object is for example materialized by a regular pattern which period is the inverse of the frequency: the modulus is the ratio $$MTF=(Imax-Imin)/(Imax+Imin),$$

where Imax and Imin are respectively the maximum and the minimum illumination observed. The modulus, i.e. the MTF, is then a scalar number which varies from zero to one.

The scale to measure the illumination is arbitrary, but it is a general practice to take a linear scale from a zero which corresponds to a black and a 1 which corresponds to a white, although it would be possible to use a non linear scale.

The MTF in one point of the image is rigorously defined when the spatial frequency has a sinusoidal variation. In practice, the image, and so the object cannot be punctual and must be of finite dimensions to be measured. A generally accepted good approximation of the MTF is done when the object is a pattern of black and white lines which occupies a small part of the Field of View (FOV) of the optical system, in the range of 1% to 5%. An object/pattern for calculating a Sagittal MTF cannot be contained in one single Sagittal plane; if the pattern is composed of parallel lines. One of the parallel lines line is then contained in the Sagittal plane, the others extend in the Tangential direction. Similarly an object/pattern for calculating a Tangential MTF cannot be contained in one single Sagittal plane; if the pattern is composed of parallel lines. One of the parallel lines line is then contained in the Tangential plane, the others extend in the Sagittal direction.

Although the complete characterization of an optical system would require the measurement of the MTF in each point of the image space, it can be shown that it is acceptable to characterize the system by the MTF in a given number of regions of the image (for example: the center, the corners and the intersection of the symmetry axis with the perimeter of the FOV). Each region is characterized for a given frequency by two values of the MTF: the MTF measured on a pattern of lines parallel to the Sagittal direction, and the MTF measured on a pattern of lines parallel to the Tangential direction.

These MTF are called in what follows: S-MTF and T-MTF.

As it is described by the theory of optical systems (see (1)), the Sagittal MTF (S-MTF) is generally different from the Tangential MTF (T-MTF), the difference measuring the Astigmatism of the optical system. Also, the S-MTF and the T-MTF components depend on the location of the point of the image seen through the optical system where they are measured: they are generally maximal at the center of the image formed by the system, and degrade when the Field of View (see (1)) increases. The optical quality is usually characterized by the MTF components S and T at the center and at the center of the extremities of the Field of View, Left and Right, Top and Bottom as shown on FIG. 3.

Figure 3:
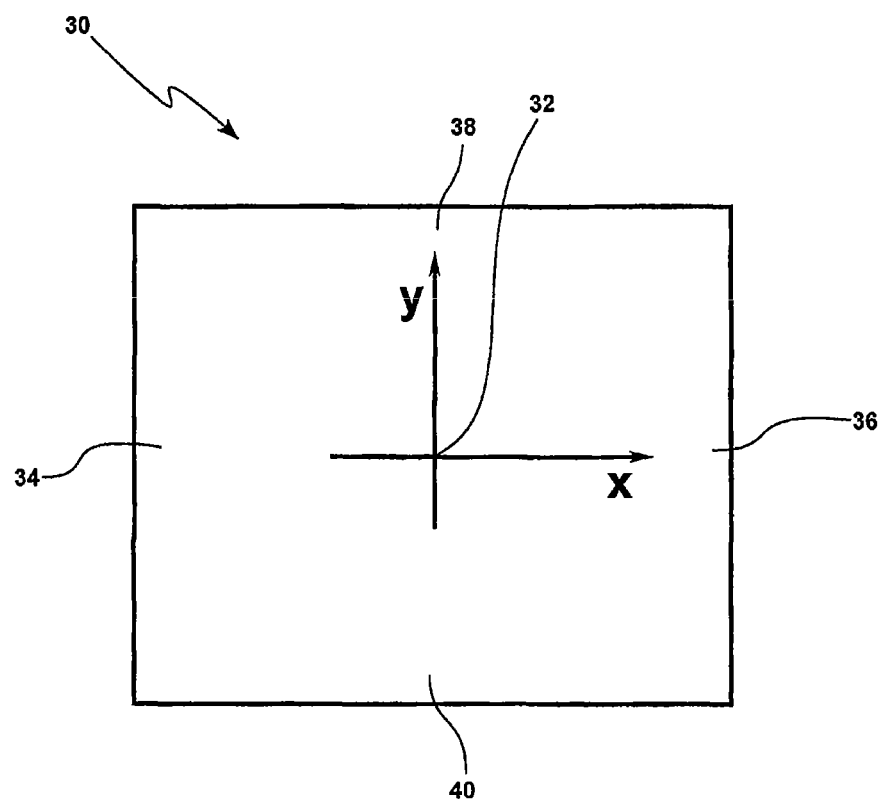
FIG. 3 illustrates a field of view of an optical module for an alignment according to the present invention.

FIG. 3 illustrates very schematically a Field of View 30, having a center 32, a center of left extremity/edge 34, a center of right extremity/edge 36, a center of top extremity/edge 38 and a center of bottom extremity/edge 40.

TOP (38) and BOTTOM (40) are aligned along the vertical direction, and LEFT (34) and RIGHT (36) are aligned along the horizontal direction.

If all the lenses which compose the optical module were perfectly aligned, the optical characteristic of the module would be symmetric with respect to the center as follows:

the TOP S-MTF (TS-MTF), calculated in 38, would be equal to the BOTTOM S-MTF (BS-MTF), calculated in 40;

the TOP T-MTF (TT-MTF), calculated in 38, would be equal to the BOTTOM T-MTF (BT-MTF), calculated in 40; and the same would be observed for LEFT (MTFs calculated in 34) and RIGHT (MTFs calculated in 36): LS-MTF=RS-MTF and LT-MTF=RT-MTF.

The present invention provides for using a module where the lenses that compose the fixed stack/optical system are not perfectly aligned. The inventors have noted that there is a position of the top lens with respect to the stack for which the differences in MTF are globally minimal, where the de-centering of the top lens with respect to the theoretical optical axis of the module gives the best compensation of the de-centering of the lenses of the fixed stack. This global minima can be defined separately for the vertical and horizontal directions by the minimum of the sum of the differences between the TOP and BOTTOM MTF and respectively between the LEFT and RIGHT MTF:

In other words, the global minima will be reached for the minimum of the functions:

$$GmV=((TS\text{-}MTF)-(BS\text{-}MTF))+((TT\text{-}MTF)-(BT\text{-}MTF)); \text{ and}$$

$$GmH=((LS\text{-}MTF)-(RS\text{-}MTF))+((LT\text{-}MTF)-(RT\text{-}MTF))$$

The sum of the differences is a linear combination of the S and T MTF in which all the coefficients are equal to 1. It is also possible to take a linear combination in which the coefficients depend on the importance one wants to give to one of the components. For example, if one wants to have an image for which the Sagittal component must be better than the Tangential component, the global minima functions will have the form:

$$GmV=\alpha((TS\text{-}MTF)-(BS\text{-}MTF))+\beta((TT\text{-}MTF)-(BT\text{-}MTF))$$

where $\alpha$ and $\beta$ are predetermined weighting coefficients with $\alpha > \beta$.

A similar modification can be done to GmH.

Another way to privilege one of the components comprises using a non linear expression, like for example:

$$GmV=((TS\text{-}MTF)-(BS\text{-}MTF))^{n1}+((TT\text{-}MTF)-(BT\text{-}MTF))^{n2}$$

Or also a combination of the two expressions, like:

$$GmV=\alpha((TS\text{-}MTF)-(BS\text{-}MTF))^{n1}+\beta((TT\text{-}MTF)-(BT\text{-}MTF))$$

where n1 and n2 are predetermined weighting coefficients. Similar modifications can be done also to GmH.

In what follows, the following simplified expressions are used:

$$(TS\text{-}MTF)-(BS\text{-}MTF)=V\Delta S$$

$$(TT\text{-}MTF)-(BT\text{-}MTF)=V\Delta T$$

$$(LS\text{-}MTF)-(RS\text{-}MTF)=H\Delta S$$

$$(LT\text{-}MTF)-(RT\text{-}MTF)=H\Delta T$$

So that $GmV=V\Delta S+V\Delta T$; and $$GmH=H\Delta S+H\Delta T$$

The optical module is calculated to make an image which center is ideally positioned at the optical center, at the intersection of the optical axis of the module and the image plane. Due to the imperfection in the alignment of the lenses which compose the module, these two centers do not coincide, but they are close, which means, translated in mathematical terms, that the center of the image is an approximation of the solution of determining the optical center. The center of the image is represented by reference 32 in FIG. 3.

The two axes, respectively parallel to the vertical and horizontal directions which pass through O are the Y and X axis of the image, as shown of FIG. 3.

Figure 4:
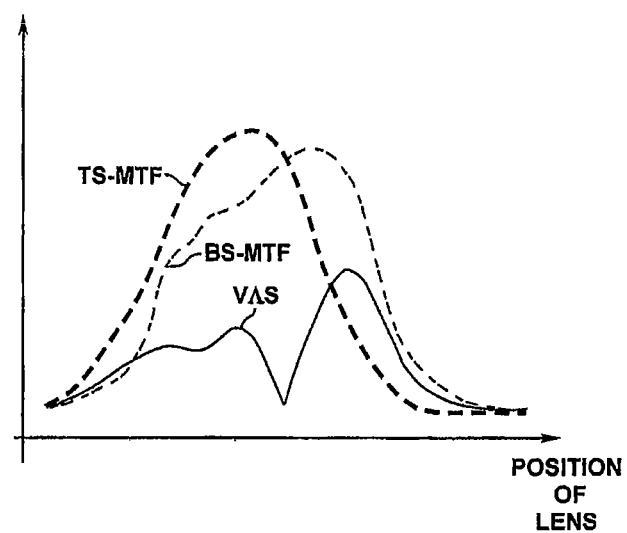
FIG. 4 illustrates the changes of the values of TS-MTF and BS-MTF, and of the resulting values of V∆S as the top lens moves along the Y axis with respect to the fixed stack/optical system

FIG. 4 illustrates the changes of the values of TS-MTF and BS-MTF, and of the resulting values of V∆S as the top lens moves along the Y axis with respect to the fixed stack/optical system. The function V∆S varies from a value close to zero to a relative maximum, then from the maximum to a relative minimum, then to a relative maximum, and again to a value close to zero, as schematized in FIG. 4. V∆T varies in a similar way (not shown on FIG. 4), albeit along a different curve than V∆S.

A position where the lens is aligned with the fixed stack corresponds to [V∆S+V∆T] as close as possible to zero (minimal), which means that V∆S and V∆T must each be close to zero; however the initial and final values cannot be a solution as they correspond to all MTF values also close to zero, as the farther the lens is from the optical center, the lower the MTF, as explained before. These initial and final solutions must be ignored to allow keeping only the point where V∆S is minimal, while the MTF are above a given threshold. Such threshold depends on the performances of the module, but can for example be chosen in the range of 30% of the MTF calculated for a theoretically perfect alignment of the lenses of the module.

The graph of V∆S may also present local minima, as shown on FIG. 4, but we have to eliminate as well these solutions, as we are looking for the point for which the function V∆S reaches an absolute minima. A similar reasoning can be done for V∆T.

In general the point for which V∆S is minimal does not coincide with the point where V∆T is minimal. The present invention provides for determining the position of the lens with respect to the fixed stack for which the function $$GmV = \alpha 1(V\Delta S)^{n1} + \beta 1(V\Delta T)^{n2}$$
$$= \alpha 1((TS\text{-}MTF) - (BS\text{-}MTF))^{n1} +$$
$$\beta 1((TT\text{-}MTF) - (BT\text{-}MTF))^{n2} \text{ is minimal}$$

Figure 5:
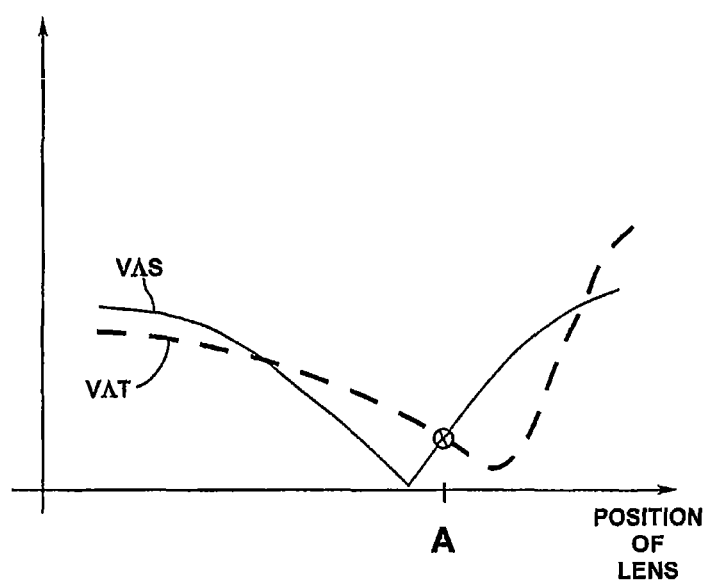
FIG. 5 illustrates the changes of the values of V∆S and V∆T as the top lens moves along the Y axis with respect to the fixed stack/optical system.
Figure 6:
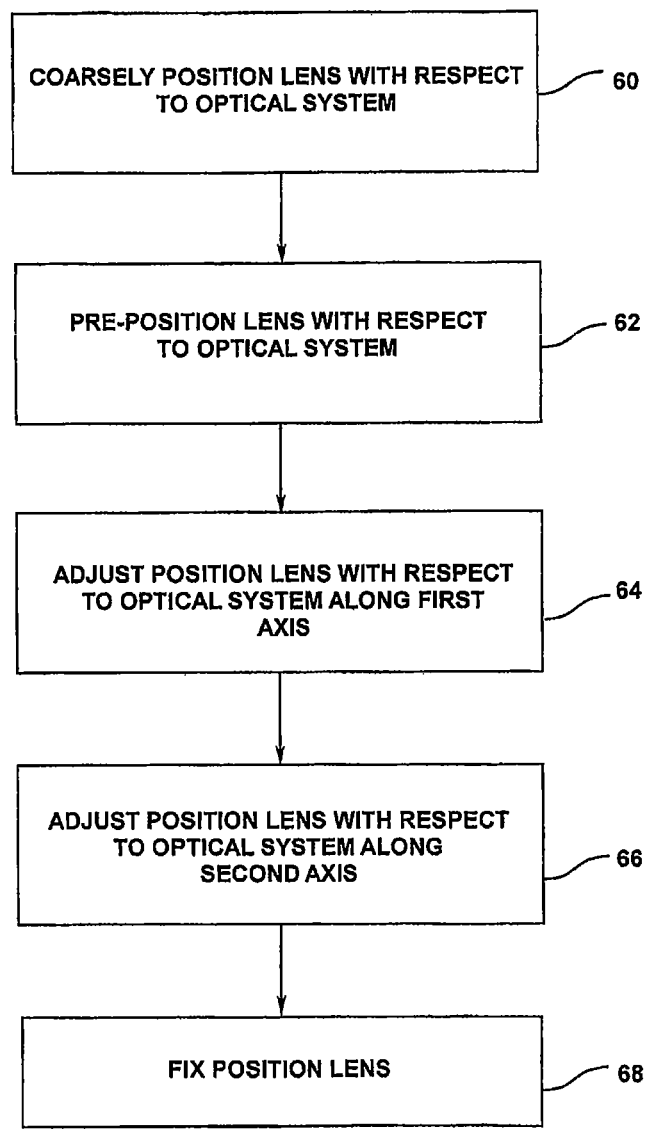
FIG. 6 illustrates a complete process for positioning a lens according to an embodiment of the invention.

When the coefficients $\alpha 1$, $\beta 1$, n1, n2 are equal to 1, this point correspond to the intersection of the graphs of V∆S and V∆T with the lowest value and for which the variation of the function V∆S+V∆T is changing from negative to positive, as shown on FIG. 5.

FIG. 5 illustrates the changes of the values of V∆S and V∆T as the top lens moves along the Y axis with respect to the fixed stack/optical system.

When the coefficients are not equal to 1, the point can be determined by a calculation of the barycenter of the solutions of V∆S and V∆T.

According to the invention, such point, which will hereafter be referenced as point A, is the point on the Y axis which gives the best balance of the Top and Bottom MTF, both for S and T components.

The theory, confirmed by simulations performed with programs available under the commercial names of ZEMAX or CODE V, which are respectively available from ZEMAX Development Corporation, 3001 112th Avenue Nebr., Suite 202, Bellevue, Wash. 98004-8017 USA and ORA 3280 East Foothill Boulevard Suite 300. Pasadena Calif. 91107-3103, shows that the solutions of the research of the minima of GmV and GmH are orthogonal, which means that the solution of GmH is located onto an axis parallel to the Horizontal direction which passes by the point which gives the solution of GmV.

Accordingly, calculations similar to the calculations which have been used to determine on the Y axis the point A which gives the best balance of the Top and Bottom MTF, both for S and T components, are used to determine on a line parallel to the X axis and crossing point A, a point B which gives the best balance of Left and Right MTF, both for S and T components.

According to the invention, the point B is the solution of the global minimization of the differences between Top and Bottom MTF and Left and Right MTF, both for S and T components.

As detailed hereafter, a method according to the invention allows determining the optimal alignment of the top lens on the fixed stack by following for example the steps:

At a pre-aligned position of the top lens, make an image of an object through the complete module (top lens plus fixed stack).

On this image, compute the MTF: TS-MTF, BS-MTF, TT-MTF, BT-MTF

If the criteria which define the point A are not met, move the top lens in the Y direction, until these criteria are satisfied.

The pre-aligned position of the lens, as well as the criteria which define the point A, are detailed hereafter.

Then, compute the MTF: LS-MTF, RS-MTF and LT-MTF, RT-MTF, and move the TOP Lens in the X axis direction until the point B is found.

It is important, from an economical point of view to perform an alignment such as explained hereabove in the shortest possible time.

The criteria used to determine the best alignment require the computation of the MTF in various points of the image, and then the time to perform the alignment will depend on:

The time T1 to capture an image of an object made with the optical module to align.

The time T2 to store this image in an appropriate form into a computer, and to compute the eight MTF required by the method: TS-MTF, BS-MTF, TT-MTF, BT-MTF, LS-MTF, RS-MTF, LT-MTF, RT-MTF.

The time T3 required to move from one lens position to another.

The number N of lens positions to examine before reaching an appropriate position.

The total time to make the alignment is N×(T1+T2+T3).

T1, T2, T3, depend on the equipment which is used: the type of sensor (with parallel or serial output), the speed of computation of the processor used to calculate the MTFs, the speed of the motors used to move from one lens position to another, while N depends on the method used to select a position.

It is then important to minimize N, and the present invention provides for doing so by starting the processes outlined above from a pre-aligned position of the lens.

The inventors have noticed that in the nominal design of the module, the center of the image of the observed object must coincide with the intersection of the optical axis of the module with the image plane.

The present invention provides for initially moving the top lens so that these centers coincide, thus coarsely positioning the lens close to its best aligned position.

The inventors have also noticed that, as the best aligned position of the lens gives the best possible balance for S and T, both between the Top and Bottom locations and Left and Right locations, it is also balancing the S MTF between the opposite corners of the image, and the same for T MTF.

The corners of the image will hereafter be referred to as UL for Upper Left, UR for Upper Right, LL for Lower Left and LR for Lower Right.

The inventors have noticed that if there is a good balance between the S components of UR and LL, for example, then the difference in the MTF of (S-UR)−(S-LL) is minimal; and if the same is true for the T components, then the sum of these differences is also minimal.

Further, the inventors have noticed that one can accelerate the calculation in the corners by determining the MTF on a pattern which MTF is a combination of Sagittal and Tangential patterns.

It can be found in the literature (see (1)) that: a Sagittal pattern is a pattern of lines along the projection of the Sagittal direction onto the image plane (or slightly slanted by a few degrees to avoid some artifacts described in the literature) and a Tangential pattern is a pattern of lines in the Tangential direction (or slightly slanted by a few degrees to avoid some artifacts described in the literature).

The Inventors have determined that such Sagittal and Tangential patterns can be combined in a Checkerboard, and that the MTF computed on such a Checkerboard is a combination of Sagittal and Tangential MTF.

An MTF calculated from a combination of Sagittal and Tangential patterns such as a Checkerboard is hereafter referred to as a Combination-MTF, or C-MTF.

According to the present invention, pre-aligning the top lens comprises:

A/ moving the top lens to make the center of the image of the observed object coincide visually with the optical axis of the fixed stack;

B/ computing the Combination MTF (C-MTF) in the corners and computing an index which characterizes the balance between the corners. This index INX can be for example:

$$INX=(\text{Max}(C\text{-}MTF)-\text{Min}(C\text{-}MTF))/(\text{Max}(C\text{-}MTF)+\text{Min}(C\text{-}MTF));$$

C/ if INX is above a predetermined value, or if any of the calculated C-MTF is below a predetermined threshold, determining which C-MTF has the lowest value and move the top lens by one predetermined step along the diagonal crossing this corner in the direction of the corner with the C-MTF having the lowest value; and D/ repeating steps B and C until INX is below a predetermined value and any of the calculated C-MTF is above a predetermined threshold.

The predetermined value and threshold for INX and the C-MTF are chosen in view of simulation data obtained for perfectly aligned lens and fixed stack.

The inventors have noted that a value of 0.1 for INX and a threshold of 50% of the nominal value given by the design simulation data, give satisfactory results.

The inventors have also determined that the predetermined step/displacement by which the lens is moved when adjusting its position according to the present invention can be defined as the minimum lens displacement that causes the MTF to change by an amount measurable using the MTF measurement means available for implementing the invention.

According to the invention, the lens is satisfactorily pre-aligned with the fixed stack once the conditions of INX being below a predetermined value and of the calculated C-MTF being above a predetermined threshold are met.

According to the present invention, if after a predetermined number of implementation of steps B and C above, INX is still above a predetermined value, or one of the calculated C-MTF is still below a predetermined threshold, the lens or the stack may be of inferior quality.

According to an embodiment of the invention, steps B and C can then be repeated until one only of the two conditions of INX being below a predetermined value or any of the calculated C-MTF being above a predetermined threshold is met.

According to an embodiment of the invention, if after a predetermined number of implementation of steps B and C above said one condition is still not met, either the lens or the sack is discarded.

Once the lens is satisfactorily pre-aligned with the fixed stack, the lens is moved to points A and B using the methods according to the invention as detailed above.

The present invention requires a number of standard equipments to capture and display an image through the module, and to move the top lens. The Equipments must however be programmed to implement the novel and inventive methods according to the present invention.

Further, an embodiment of the present invention provides a specific source object that allows computing the various MTF detailed above.

The dimensions of a source object according to the invention depend on the distance at which it is placed with respect to the module. The distance is usually the Hyperfocal distance of the module, but can be different depending on the distance at which the nominal performances of the module are specified.

A source object according to the invention comprises for example the patterns required for the computation of the S and T components, in Top, Bottom, Left and Right, which are sets of lines which width is determined by the spatial frequency at which we want to make the analysis.

For S such pattern is a pattern of lines in the S direction as defined above (or slightly slanted by a few degrees to avoid some artifacts described in the literature) and for T a pattern of lines in the T direction (or slightly slanted by a few degrees to avoid some artifacts described in the literature).

The four corners comprise for example each a checkerboard, which is a combination of patterns for S and T. The rows and columns of the checkerboards do not necessarily have the same spatial frequency as the S and T patterns. It may be convenient to use a lower spatial frequency as the lower the frequency, the higher the MTF. However, as also the lower the frequency, the lower the accuracy of the measurement, the choice of the spatial frequency used for the checkerboards is a compromise.

Figure 7:
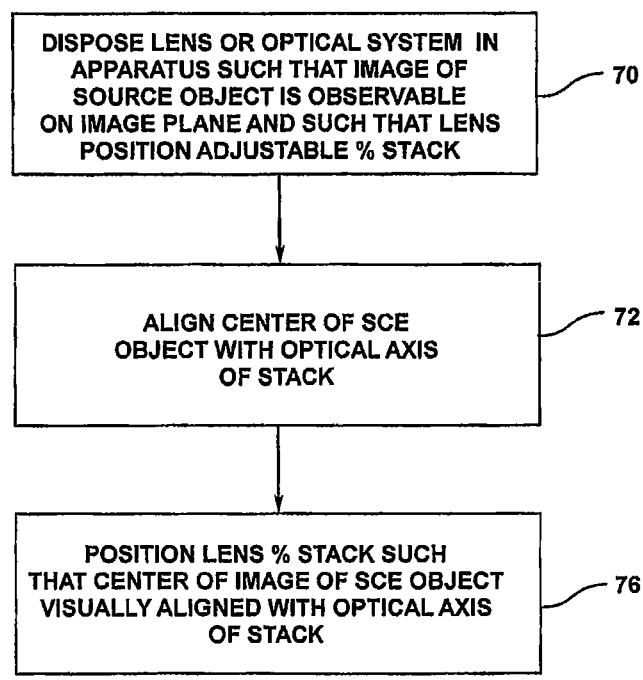
FIG. 7 illustrates a process for coarsely positioning a lens according to an embodiment of the invention.

As illustrated in FIGS. 6, 7, 8, 9 and 10, an embodiment of the present invention comprises the following steps:

At a step 60, the module having a lens that is to be aligned with a fixed stack is placed (70) on an appropriate dispositive as illustrated in FIG. 7, such that:

An image of a source object is formed through the module onto a sensor, able to transform the image of the source object into a signal which can be processed to calculate the MTF in any point of the image. The module is adjusted at a correct focal length by appropriate means. In case the focal length is modified by the position of the top lens, then appropriate means to keep a correct focus are provided.

The source object comprises patterns which allow calculating separately the Sagittal (S) and Tangential (T) components of the MTF in the Top, Bottom, Left, and Right positions as shown on FIG. 3. In FIG. 3, the positions are represented at the extremity of the Vertical and Horizontal Field of View (VFOV and HFOV) but it has to be noted that these positions can be defined at any value at the diagonal Field of View (FOV), depending on the specification of the module. For example, the Left and Right position can be defined at 60% FOV, and in this case the distance between the center and the position of the Left and Right patterns will be equal to 60% of the diagonal of the image.

The source object also comprises four patterns, one in each corner, which allow to compute a Combination MTF value, noted C-MTF which is a combination of the S and T components of the MTF, for example, but not limited to, a linear combination of the form $$C\text{-}MTF = a \cdot S + b \cdot T,$$

where a and b are real or complex numbers.

In the case of a linear combination with real numbers, these patterns have the appearance of a checkerboard.

The source object also preferably comprises additional patterns that allow determining accurately the position of its center. The center of the source object is aligned (72) with the optical axis of the stack.

The top lens is supposed to be held by appropriate means that allow moving the lens step by step with respect to the fixed stack with the necessary accuracy, for example 0.5 microns. The movement is controlled by appropriate means depending on the result of the calculation of the MTF performed on the image of the source object.

The complete description of the method is then, given that at the start of the process, the position of the top lens with respect to the fixed stack is random:

Move (76) the top lens until the center of the source object seen on the image formed on the image plane/on the sensor coincides visually with the intersection of the optical axis of the stack with the image plane.

Figure 8:
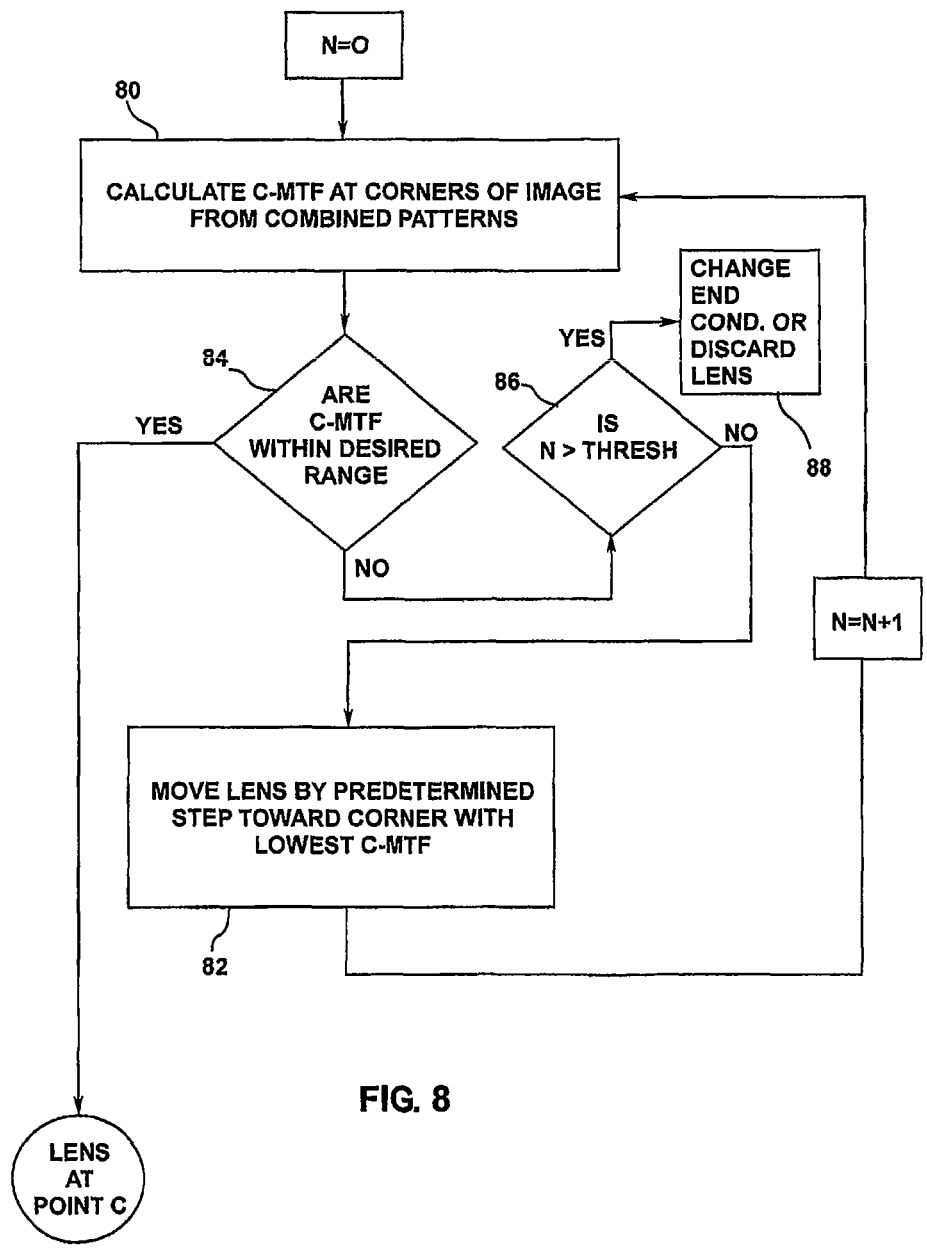
FIG. 8 illustrates a process for pre-positioning a lens according to an embodiment of the invention.

The lens is then pre-positioned (62) as follows, as illustrated in FIG. 8:

a) Compute (80) the combined C-MTF in the corners.

b) Determine which MTF is the lowest and move (82) the top lens step by step along the diagonal crossing the lowest-C-MTF-corner in the direction which improves the MTF C-MTF (toward the corner having the lowest C-MTF). At each step (a simulation of the system gives the size of a step, which corresponds to the distance the top lens must be moved to get a measurable change of the C-MTF; measurable with the available apparatus), compute the C-MTF of all corners, and compute an index which characterizes the balance between the four corners.

This index INX can be for example:

$$INX = (\text{Max}(C\text{-}MTF) - \text{Min}(C\text{-}MTF))/(\text{Max}(C\text{-}MTF) + \text{Min}(C\text{-}MTF)).$$

Stop (84) when INX is below a value we consider as acceptable, for example 10%, and when each C-MTF is above a value considered as acceptable, for example 50% of the nominal value given by the design simulation data (with the top lens perfectly aligned).

This in substance moves the top lens along directions parallel to the two diagonals until the desired conditions are met. If (86) after a given number of steps, for example 20, both conditions cannot be met simultaneously, then the second conditions of the minimum value for the C-MTF are droped (88), (or another choice) and if after a further number of steps the first condition cannot be met, the alignment is considered not possible.

Figure 9:
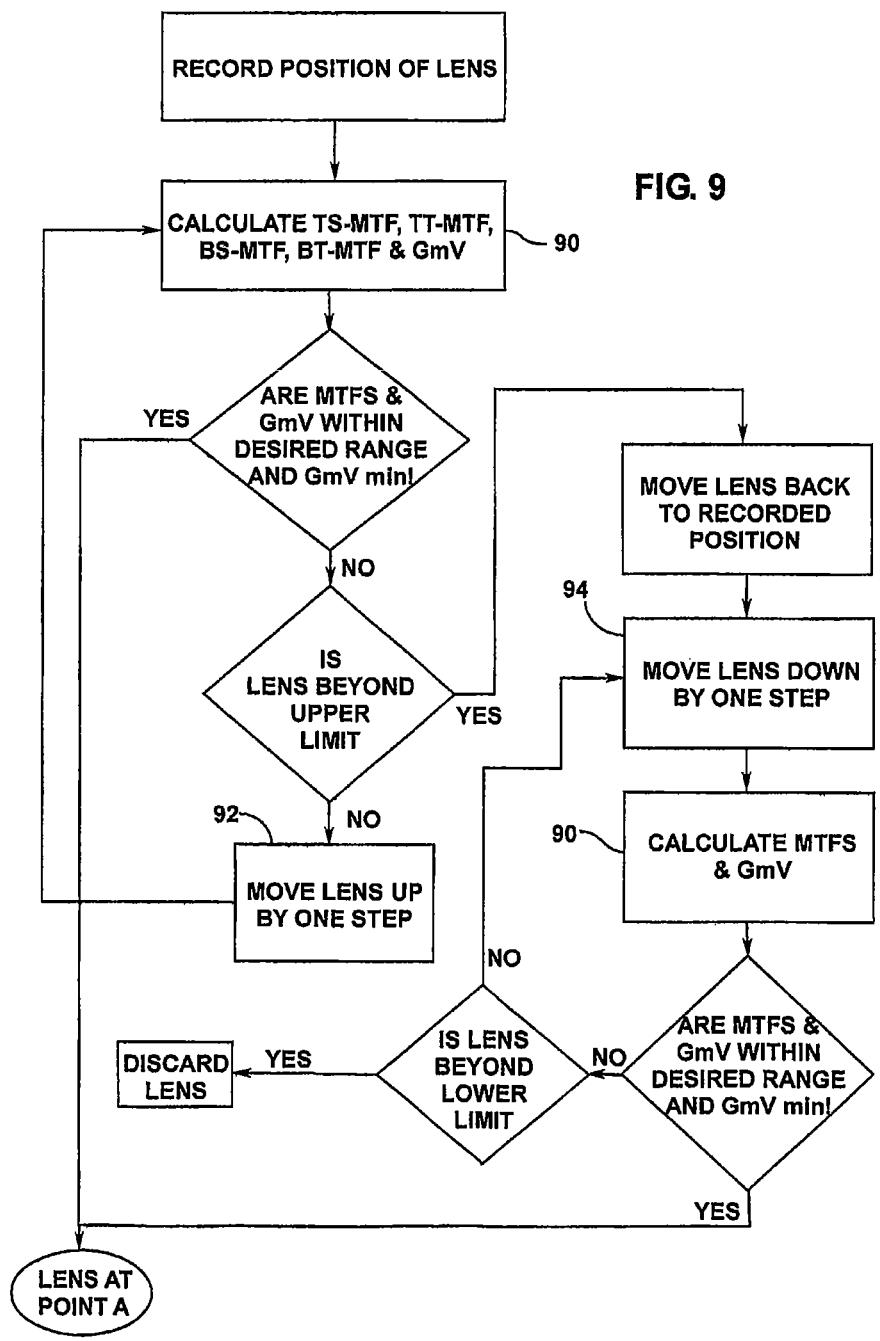
FIG. 9 illustrates a process for precisely positioning a lens along the Y axis according to an embodiment of the invention.

The center of the top lens is then at a point called C. The position of the lens is then adjusted (64) along the Y axis as follows, as illustrated in FIG. 9:

From this point C, compute (90) the S and T components of MTF in the Top and Bottom locations.

Move step by step the top lens in the Y direction. At each step, compute the function:

$$GmV = ((TS\text{-}MTF) - (BS\text{-}MTF)) + ((TT\text{-}MTF) - (BT\text{-}MTF)),$$

noted as explained above $$GmV = V\Delta S + V\Delta T,$$

or a variant of this function using weighting coefficients as detailed above.

Move the top lens step by step, if necessary first in the direction to the Top (92), then to the Bottom (94) if for example a top limit of the field of view is reached, until an absolute minimum of GmV is reached. The absolute minimum is characterized by:

Each of the four components of the expression (TS-MTF), (BS-MTF), (TT-MTF), (BT-MTF) having a value above a predetermined limit, for example 30% of the nominal value of the same MTF component determined by design, and each of the V$\Delta$S and V$\Delta$T expressions having a value below a predetermined limit, for example 10% of the maximum of the (TS-MTF), (BS-MTF), (TT-MTF), (BT-MTF) expressions.

As many points may satisfy this equation, the point which is selected is the point which satisfies also the condition above, and for which the values of the function V$\Delta$S+V$\Delta$T is the lowest, so that the function V$\Delta$S+V$\Delta$T reaches a minimum, characterized by the fact that the variation of this function changes from negative to positive.

Figure 10:
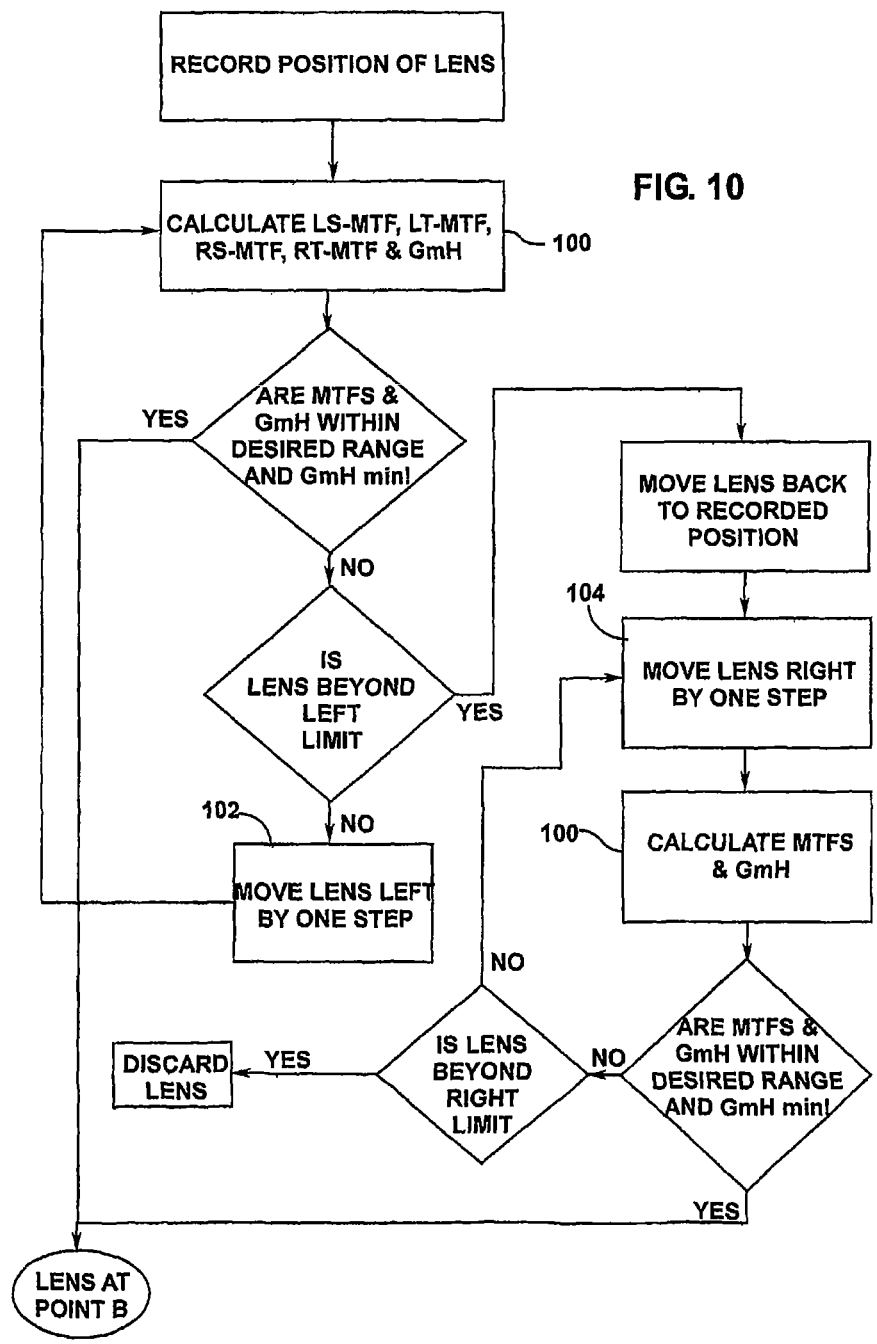
FIG. 10 illustrates a process for precisely positioning a lens along the X axis according to an embodiment of the invention.

The center of the top lens is then at a point called A. The position of the lens is then adjusted (66) along the X axis as follows, as illustrated in FIG. 10:

From A, compute (100) the S and T components of MTF in the Left and Right locations.

Move step by step the top lens in the X direction. At each step, compute (10) the function:

$$GmH=((LS\text{-}MTF)-(RS\text{-}MTF))+((LT\text{-}MTF)-(RT\text{-}MTF)), \text{ noted}$$

$$GmH=H\Delta S+H\Delta T$$

or a variant of this function using weighting coefficients as detailed above.

Move the top lens step by step, if necessary first in the direction to the Left (102), then to the Right (104) if for example a left limit of the field of view is reached, until an absolute minimum of GmH is reached. The absolute minimum is characterized by:

Each of the four components of the expression (LS-MTF), (RS-MTF), (LT-MTF), (RT-MTF) having a value above a predetermined limit, for example 30% of the nominal value of the same MTF component determined by design, and each of the H$\Delta$S and H$\Delta$T expressions having a value below a predetermined limit, for example 10% of the maximum of the (LS-MTF), (RS-MTF), (LT-MTF), (RT-MTF) expressions As many points may satisfy this equation, the point which is selected is the point which satisfies also the condition above, and for which the values of the function H$\Delta$S+H$\Delta$T is the lowest, so that the function H$\Delta$S+H$\Delta$T reaches a minimum, characterized by the fact that the variation of this function changes from negative to positive.

The center of the top lens is then at a point called B which is the optimal centering of the top lens onto the fixed stack according to the present invention.

The position of the lens is then fixed (68), for example using a sealant or any appropriate mechanical means.

Figure 11:
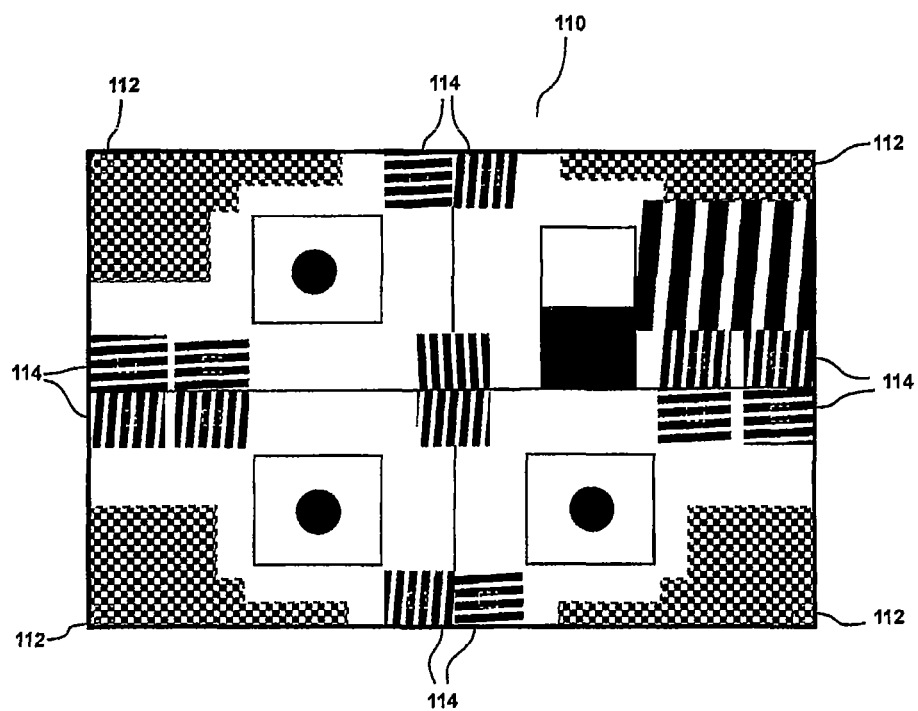
FIG. 11 shows a source object according to an embodiment of the invention.

FIG. 11 shows an embodiment of source object according to the present invention.

A source object 110 comprises, in each of four coarse measurement locations (the corners of the object in the example illustrated) situated close to the edges of the object along two axes (the diagonals in the example illustrated) crossing the center of the object, a pattern 112 comprising a combination of a Sagittal pattern and a Tangential pattern.

The source object further comprises, in each of four precise measurement locations (the middle of the edges in the example illustrated) situated close to the edges of the objects along first and second precise positioning axes (the X and Y axes in the example illustrated) crossing the center of the object, a pattern 114 comprising a juxtaposition of a Sagittal pattern and a Tangential pattern.

In the example illustrated, the juxtaposition of a Sagittal pattern and a Tangential pattern comprises a set of lines parallel to the first precise positioning axis of the object juxtaposed with (or near) a set of lines parallel to the second precise positioning axis of the object, each set of lines being on one side of the corresponding precise positioning axis of the object. The term "middle" of the image edge therefore refers here to a region generally near the middle edge of the image and big enough for containing the juxtaposition of a Sagittal pattern and a Tangential pattern.

Similarly, the term "corner" of the image refers to a region generally near the corner of the image and big enough for containing the combination of a Sagittal pattern and a Tangential pattern.

As illustrated in FIG. 11, the lines of the sets of lines can be slanted by a few degrees with respect to the parallel to the first and second precise positioning axis. Such slanting of the lines advantageously allows avoiding measurement errors when the image is to be captured by sensing elements that would be parallel to the lines.

In the example illustrated, the combination of a Sagittal pattern and a Tangential pattern comprises a checkerboard pattern having rows and columns respectively parallel and perpendicular to the Y axis of the object.

The rows and columns of the checkerboard can also be slanted by a few degrees with respect to the X and Y axes of the image.

The present invention has been described in relation with a number of embodiments, but the skilled reader will without difficulty modify the described embodiments without departing from the present invention.

For example, the present invention has been described with respect to a pre-alignment of the lens using patterns combining Sagittal and Tangential patterns at the corners of an image, followed by a precise alignment of the lens using patterns juxtaposing Sagittal and Tangential patterns at the top, bottom, left and right of the image.

However, the present invention relates more generally to pre-aligning a lens with an optical system by: starting with the lens roughly aligned on the optical system, following the steps of: a/calculate a coarse MTF for the combined lens & optical system on at least four coarse measurement locations, b/move toward location of lowest coarse MTF by a predetermined distance, c/goto a/ unless the predetermined condition are reached).

The present invention also relates more generally to pre-aligning a lens with an optical system by: starting with the lens roughly aligned on the optical system, correcting the position of the lens until the values of Modulation Transfer Functions calculated for a pattern comprising a combination of a Sagittal pattern and a Tangential pattern at four coarse measurement locations are in predetermined ranges.

Also, the invention has been described in relation with a pre-alignment using coarse MTFs calculated in the corners of the image, along the diagonals of the image, followed by a precise alignment using precise MTFs calculated along the X and Y axes of the image. However, the invention also relates to using coarse MTFs calculated in other positions disposed symmetrically along other lines crossing the center of the image. The invention also relates to using precise MTFs calculated in other positions disposed symmetrically along other lines crossing the center of the image.

The invention has been described in relation with checkerboards following the X and Y axes of the image, but the checkerboards can also follow other directions, such as for example the diagonals of the picture.

Figure 1:
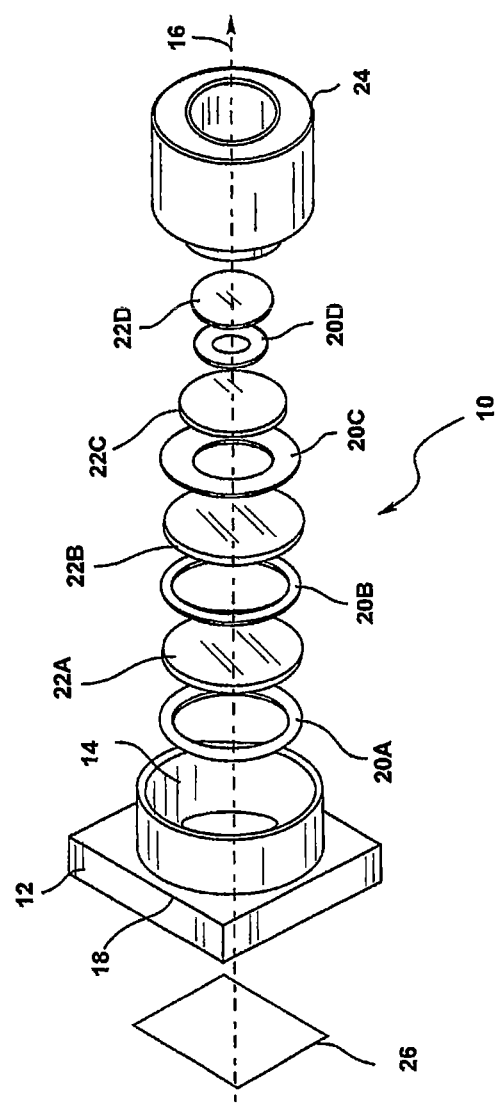
FIG. 1 shows an elevation view of the main elements composing an optical module.

FIG. 1 illustrates an example of optical module where the top lens can be aligned according to the present invention, but the present invention applies to aligning any lens of any module with respect to an optical system of the module with which the lens is to be aligned. Such optical system may have one or more lens or not and/or may comprise a sensor or not. The invention was described in relation with the alignment of a top lens of a module, but is can also be used to align another lens of a module, if appropriate.

The invention claimed is:

1. A process for pre-aligning a lens with an optical system, the process comprising:
    providing a lens and an optical system having an optical axis, wherein the lens is apt to be aligned with the optical system to form on an image plane an image of a source object, the image having a center and having top, bottom, left and right edges;
    coarsely positioning the lens with respect to the optical system; and
    in a plane normal to the optical axis of the optical system, correcting the position of the lens until the values of four Combination Modulation Transfer Functions (C-MTF) are in predetermined ranges, the C-MTFCs being calculated at four coarse measurement locations situated between the edges and the center of the image in a Field Of View of the image along two coarse positioning axes crossing the center of the image, each for a combination pattern comprising a combination of a Sagittal pattern and a Tangential pattern.

2. The method of claim 1, wherein the two axes of the image comprising the coarse measurement locations follow diagonals of the image, and wherein the four coarse measurement locations are situated at four corners of the image.

3. The method of claim 1, wherein coarsely positioning the lens comprises aligning the center of the source object with the optical axis of the optical system; and positioning the lens with respect to the optical system such that the image of the center of the source object formed on the image plane coincides with an intersection of the image plane and the optical axis of the optical system.

4. The method of claim 1, further comprising providing an image sensor capable of sensing the image of the source object on the image plane.

5. The method of claim 1, wherein correcting the position of the lens until the values of the four C-MTFs are in predetermined ranges comprises repeating the steps:
    calculating the C-MTFs; and
    in a plane normal to the optical axis of the optical system, along a line parallel to the coarse positioning axis of the image comprising the coarse measurement location having the C-MTF with the lowest value, moving the lens by a predetermined step toward said coarse measurement location;
    until any of the C-MTFCs is above a predetermined C-MTF threshold and a difference between the largest C-MTF and the smallest C-MTF is below a predetermined C-MTF difference threshold, or until the lens is moved a predetermined number of times.

6. The method of claim 5, further comprising:
    providing the source object having, in four coarse measurement locations, a combination of a Sagittal pattern and a Tangential pattern.

7. The method of claim 6, further comprising:
    providing the source object having, in its four coarse measurement locations, a checkerboard pattern having rows and columns respectively parallel and perpendicular to a top-to-bottom axis of the object.

8. A process for aligning a lens with an optical system, the process comprising:
    pre-aligning the lens with the optical system according to the method of claim 1;
    adjusting the position of the lens, in the plane normal to the optical axis of the optical system along a line parallel to a first precise positioning axis that crosses the center of the image and passes through first and second precise measurement locations situated between opposite edges of the image and the center of the image in a Field Of View of the image, until first and second Sagittal and Tangential Modulation Transfer Functions of the combined lens and optical system, calculated at the first and second precise measurement locations, are such that difference between the Sagittal Modulation Transfer Functions of the first and second precise measurement locations and difference between the Tangential Modulation Transfer Functions of the first and second precise measurement locations are minimal, each of the Sagittal and Tangential Modulation Transfer Functions being above a first predetermined threshold; and
    adjusting the position of the lens, in the plane normal to the optical axis of the optical system along a line parallel to a second precise positioning axis that crosses the center of the image and passes through third and fourth precise measurement locations situated between opposite edges of the image and the center of the image in a Field Of View of the image, until third and fourth Sagittal and Tangential Modulation Transfer Functions of the combined lens and optical system, calculated at the third and fourth precise measurement locations, are such that difference between the Sagittal Modulation Transfer Functions of the third and fourth precise measurement locations and difference between the Tangential Modulation Transfer Functions of the third and fourth precise measurement locations are minimal, each of the Sagittal and Tangential Modulation Transfer Functions being above a second predetermined threshold.

9. The process of claim 8, wherein:
    the first and second precise measurement locations are situated at a middle of a top and a middle of a bottom of the image, the first precise positioning axis being a vertical axis of the image and the first and second Sagittal and Tangential Modulation Transfer Functions being Top and Bottom Sagittal and Tangential Modulation Transfer Functions; and
    the third and fourth precise measurement locations are situated at a middle of a left and a middle of a right of the image, the second precise positioning axis being a horizontal axis of the image and the third and fourth Sagittal and Tangential Modulation Transfer Functions being Left and Right Sagittal and Tangential Modulation Transfer Functions.

10. The method of claim 9, wherein:
    adjusting the position of the lens along a line parallel to the vertical axis of the image comprises:
    adjusting the position of the lens along said line until:
    any of a Top Sagittal Modulation Transfer Function (TS-MTF) and a Top Tangential Modulation Transfer Function (TT-MTF) of the combined lens and optical system, calculated at said middle of the top of the image, and
    any of a Bottom Sagittal Modulation Transfer Function (BS-MTF) and a Bottom Tangential Modulation Transfer Function (BT-MTF) of the combined lens and optical system, calculated at the said middle of the bottom of the image,
    are above the first predetermined threshold; and a value $GmV = \alpha1((TS\text{-}MTF)-(BS\text{-}MTF))^{n1} + \beta1((TT\text{-}MTF)-(BT\text{-}MTF))^{n2}$, reaches a minimum below a third predetermined threshold, where $\alpha1, \beta1, n1, n2$ are predetermined weighting factors; and said adjusting the position of the lens along a line parallel to the horizontal axis of the image comprises:

adjusting the position of the lens along said line until:

any of a Left Sagittal Modulation Transfer Function (LS-MTF) and a Left Tangential Modulation Transfer Function (LT-MTF) of the combined lens and optical system, calculated at said middle of the left of the image, and any of a Right Sagittal Modulation Transfer Function (RS-MTF) and a Right Tangential Modulation Transfer Function (RT-MTF) of the combined lens and optical system, calculated at the said middle of the right of the image, are above the second predetermined threshold; and a value $GmH = \alpha2((TS\text{-}MTF)-(BS\text{-}MTF))^{n3} + \beta2((TT\text{-}MTF)-(BT\text{-}MTF))^{n4}$ reaches a minimum below a fourth predetermined threshold, where $\alpha2, \beta2, n3, n4$ are predetermined weighting factors.

11. The method of claim 10, where:

GmV reaches a minimum when a variation of GmV changes from negative to positive; and GmH reaches a minimum when a variation of GmH changes from negative to positive.

12. The method of claim 10, wherein said adjusting the position of the lens along a line parallel to the vertical axis of the image comprises:

repeating the steps of:

calculating the Top and Bottom, Sagittal and Tangential Modulation Transfer Function values and the GmV value; and moving the lens by a predetermined step in a first direction along a vertical line;

until the calculated values have the desired levels with respect to the first and third predetermined thresholds and GmV reaches a minimum or until the lens reaches a predetermined outward position; and if the lens reaches said predetermined outward position in said first direction, moving back the lens to its original position on said vertical line and repeating the steps of:

calculating the Top and Bottom, Sagittal and Tangential Modulation Transfer Function values and the GmV value; and moving the lens by a predetermined step in a direction opposite the first direction along said vertical line;

until the calculated values have the desired levels with respect to the first and third predetermined thresholds and GmV reaches a minimum or until the lens reaches a predetermined outward position in said opposite direction, in which case the lens is discarded.

13. The method of claim 10, wherein said adjusting the position of the lens along a line parallel to the horizontal axis of the image comprises:

repeating the steps of:

calculating the Left and Right, Sagittal and Tangential Modulation Transfer Function values and the GmH value; and moving the lens by a predetermined step in a first direction along a horizontal line;

until the calculated values have desired levels with respect to the second and fourth predetermined thresholds and GmH reaches a minimum or until the lens reaches a predetermined outward position; and if the lens reaches said predetermined outward position in said first direction, moving back the lens to its original position on said horizontal line and repeating the steps of:

calculating the Left and Right, Sagittal and Tangential Modulation Transfer Function values and the GmH value; and moving the lens by a predetermined step in a direction opposite the first direction along said horizontal line;

until the calculated values have the desired levels with respect to the second and fourth predetermined thresholds and GmH reaches a minimum or until the lens reaches a predetermined outward position in said opposite direction, in which case the lens is discarded.

* * * * *